US010628512B2

(12) United States Patent
Pavitt et al.

(10) Patent No.: US 10,628,512 B2
(45) Date of Patent: Apr. 21, 2020

(54) CALLBACK NOTIFICATION FOR UNAVAILABLE WEBSITES

(71) Applicant: International Business Machines Corporation, Armonk, NY (US)

(72) Inventors: Ross B. Pavitt, Bordon (GB); Alexander J. Kelly, Romsey (GB); Edwin P. J. Moffatt, Hursley Park (GB); Alexander D. S. Mirski-Fitton, East Grimstead (GB)

(73) Assignee: International Business Machines Corporation, Armonk, NY (US)

(*) Notice: Subject to any disclaimer, the term of this patent is extended or adjusted under 35 U.S.C. 154(b) by 54 days.

(21) Appl. No.: 15/971,345

(22) Filed: May 4, 2018

(65) Prior Publication Data
US 2019/0340259 A1 Nov. 7, 2019

(51) Int. Cl.
| G06F 16/958 | (2019.01) |
| H04L 12/26 | (2006.01) |
| H04L 29/14 | (2006.01) |
| H04L 29/08 | (2006.01) |
| G06F 16/951 | (2019.01) |
| G06F 16/957 | (2019.01) |

(52) U.S. Cl.
CPC ........ *G06F 16/958* (2019.01); *H04L 43/0817* (2013.01); *H04L 69/40* (2013.01); *G06F 16/951* (2019.01); *G06F 16/957* (2019.01); *H04L 67/02* (2013.01)

(58) Field of Classification Search
None
See application file for complete search history.

(56) References Cited

U.S. PATENT DOCUMENTS

| 7,793,141 | B1 | 9/2010 | Miller | |
| 7,978,835 | B2 | 7/2011 | Paden | |
| 8,181,071 | B2 | 5/2012 | Cahill | |
| 8,307,110 | B1* | 11/2012 | Katzer | H04L 12/1859 709/232 |
| 9,882,976 | B1* | 1/2018 | Kendall | H04L 67/1031 |
| 2013/0086194 | A1* | 4/2013 | Estes | G06F 11/0709 709/207 |
| 2016/0048418 | A1 | 2/2016 | Le | |

OTHER PUBLICATIONS

"Free Website Monitoring Service", Service Uptime, © Service Uptime 2005-2018, 3 pages, <https://www.serviceuptime.com/>.

(Continued)

*Primary Examiner* — Scott B Christensen
(74) *Attorney, Agent, or Firm* — Robert J. Shatto

(57) ABSTRACT

A server receives a first request for website access from an application on a device. The server determines the website is unavailable. The server identifies the status resource, wherein the status resource provides in-band updates on an availability of the website. The server provides status resource information to the device via the application on the device which communicated the first request. The server receives a second request for website access from the application on the device after the status resource information indicates that the website is available. The server provides access to the website.

18 Claims, 5 Drawing Sheets

(56) References Cited

OTHER PUBLICATIONS

"Service to service only", Envoy, © Copyright 2016-2018, Envoy Project Authors, 2 pages, <https://www.envoyproxy.io/docs/envoy/latest/intro/deployment_types/service_to_service>.

"Website Monitoring alerts, Get alerts for website downtime", Site24x7, © 2017, 4 pages, <https://www.site24x7.com/website-monitoring-alert.html>.

Tedds, et al., "503 Service Unavailable—HTTP | MDN", Last printed Feb. 21, 2018, 3 pages, <https://developer.mozilla.org/en-US/docs/Web/HTTP/Status/503>.

* cited by examiner ated with the description, serve to explain the principles of the disclosure. The drawings are only illustrative of certain embodiments and do not limit the disclosure.

CALLBACK NOTIFICATION FOR UNAVAILABLE WEBSITES

BACKGROUND

Websites can often experience downtime due to issues such as large unexpected traffic spikes, failing hardware, or attacks by malicious parties. While virtualization and provisioning solutions exist to mitigate some of these issues, it is not uncommon for websites to be down. Users who are experiencing difficulties accessing a website often will attempt to refresh the website, which can lead to the problem worsening, due to additional traffic to an overburdened website, and a poor user experience as the user may not feel they are aware of the issue being handled.

SUMMARY

Disclosed herein are embodiments of a method, system, and computer program product for facilitating website access using a status resource. A server receives a first request for website access from an application on a device. The server determines the website is unavailable. The server identifies the status resource, wherein the status resource provides in-band updates on an availability of the web site. The server provides status resource information to the device via the application on the device which communicated the first request. The server receives a second request for website access from the application on the device after the status resource information indicates that the website is available. The server provides access to the website.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
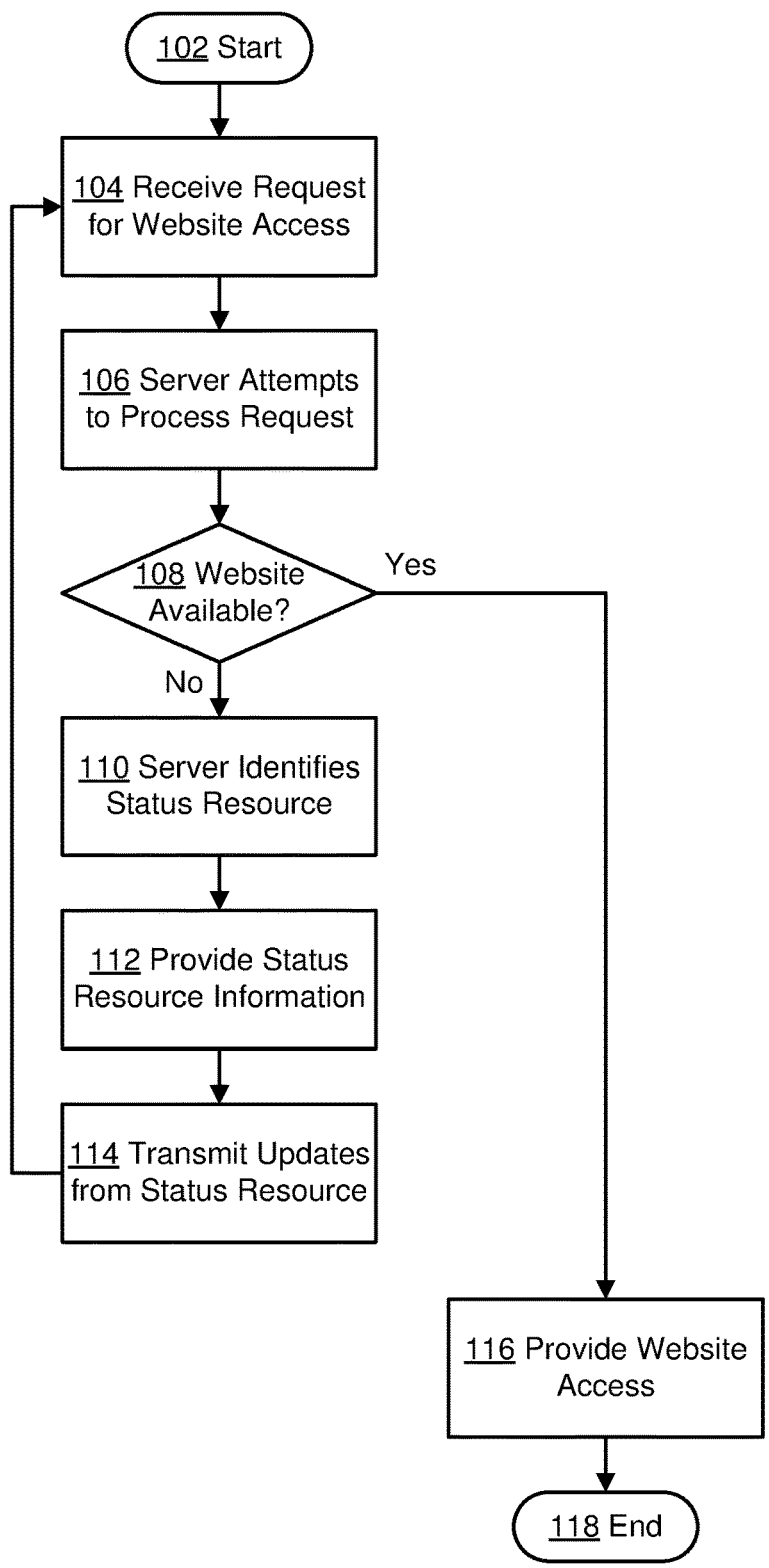
FIG. 1 depicts an example method for facilitating website access using a status resource, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate generally to accessing websites, and more specifically, to notification of a browser when an unavailable website becomes available using a status resource. While the present disclosure is not necessarily limited to such applications, various aspects of the disclosure can be appreciated through a discussion of various examples using this context.

When a user is experiencing difficulties accessing a website, in addition to attempting to refresh the website manually, some tools allow a user to automatically poll or re-try accessing websites. Such a tool is essentially a faster version of a human refreshing a website. While this may enable a user to access the website faster when it becomes available again, this can further exacerbate the difficulties a server hosting the website has, due to increased traffic. On the other side, a webserver can enable a proxy server to redirect traffic in situations of a failing back end resource and configure the site to refresh on an interval. However, this is still a polling process using additional attempts to achieve the desired result, website access for the user. Companies can use third party or other outside services or resources to notify users of website unavailability, such as by emailing or otherwise directly messaging known users, posting availability information on social media like Facebook™, Twitter™, etc., or otherwise notifying users or potential users through an outside channel.

Embodiments of the present disclosure include adding the capability for a website undergoing an outage to register that it is down with the browser so that the browser does not retry repeatedly but is notified when the website is expected to be back. This can occur by utilizing an intermediate server, such as a proxy server. The intermediate server receives a request from a user to access a website and attempts to process the request to provide access to the website. If the website is unavailable due to the webserver being unable to process the request, an appropriate error code can be returned. Additionally, the intermediate server can identify a status resource and provide the status resource information to the user device. As used herein a status resource is a resource which can provide in-band notification regarding the status of the requested website to the user device via the same application which was used to request the website, such as a web browser. Furthermore, as used herein an in-band notification is a notification provided without requirement of an external resource (examples of external resources include email, text message, or social media notification). The status resource can include another website URL (uniform resource locator) or Uniform Resource Identifier (URI), a websocket URL, or a messaging endpoint. The user device's browser can communicate with and receive updates from the status resource including status updates, estimated times to website availability, and notification that the website is available. The user's browser can display some or all of this information to a user and/or reload the website automatically when it is available. Subsequent requests from the device for the website can be handled by the status resource, until the server notifies the status resource that it is available. Thereafter, upon receiving another request for website access from the application on the device after the status resource information indicates that the website is available, the intermediate server can provide access to the website.

Some embodiments of the present disclosure may include one, or more, of the following features, characteristics, advantages and/or operations: (i) a method for a website undergoing an outage to register that it is down with the browser so that the browser does not retry repeatedly; (ii) the browser is notified when the website is back; (iii) setting up a long standing connection to a specified server status port, embedded in the error page, that would notify the browser from the server status port when the requested website came back on line and it is time to refresh; (iv) a user selectable option, in a list of options after failure occurs, where the browser would automatically connect when the service returned; (v) uses an in-band retry mechanism; and/or (vi) manages clients reconnecting after an outage.

Compared to known solutions, this disclosure provides benefits of in-band notifications to notify a user that an issue is known and can include notifying a user of an expected duration of the outage. As compared to out-of-band communications, such as text message or email, the in-band notifications described herein have the advantage that they can be provided via the same communication process used to request the website. As a result, the in-band notifications can be more likely to result in fewer attempts by a user device to refresh the unavailable website, as a user will be more likely to receive the notification and understand the outage. Thus, the website will receive less traffic from users refreshing the website and thereby sending additional requests to the website during the availability outage. Instead, subsequent requests from the device can be handled by the status resource until the server notifies the status resource that it is now available. These improvements and/or advantages are a non-exhaustive list of example advantages. Embodiments of the present disclosure exist which can contain none, some, or all of the aforementioned advantages and/or improvements.

Referring now to FIG. 1, depicted is an example method 100 for facilitating website access using a status resource, in accordance with embodiments of the present disclosure. Method 100 can include more or less actions than those depicted. Method 100 can include actions in different orders than those depicted. Method 100 can be performed using an intermediate server (such as intermediate server 400 depicted in FIG. 4), which can be a proxy server or other intermediate server which a user or user's web browser can access when attempting to connect to a website hosted by a web server. The intermediate server can be operated by a third party or can be operated by the same entity which operates the web server.

From start 102, an intermediate server receives a request for website access at 104. A user can initiate such a request using a web browser, such as one found on a desktop computer, laptop computer, mobile phone, tablet, gaming system, or any other device which includes a web browser. A user can also initiate a request using any other device or program which can access internet websites. The intermediate server can receive such a request through a network (such as network 300 depicted in FIG. 3 below).

At 106, the intermediate server attempts to process the request for website access. This can include communicating the request to the web server and receiving any response from the web server. If the web server is operational, this response can be (or include) the contents of a requested web page or other information requested from the web server. If the web server is experiencing an outage or is otherwise unavailable, the intermediate server may receive no response or may receive a response indicating an error. This could include an appropriate HTTP code such as 503: Server Unavailable.

At 108, the intermediate server determines whether the website is available based upon the response or lack thereof from 106. If the web server is available at 108, method 100 can proceed to 116 and provide access to the website to the requesting user, web browser, or device. If the web server is not available at 108, method 100 can proceed to operation 110.

At 110, the intermediate server identifies a status resource. The intermediate server can contain or access a list of status resources which are able to provide information on the status of websites and select an appropriate status resource for the website to which access has been requested. The intermediate server can request instruction from the website to which access has been requested or a designated webmaster or other contact individual to assist in identifying a status resource.

In various embodiments, the status resource can take various forms. The status resource can be any resource capable of providing the status of the web server to the application (e.g. browser) which was used to request the website. In some embodiments, this can be another website identified by an HTTP URL or URI which can be monitored, and which indicates the status of the web server. In such embodiments, the user device can monitor this URL or URI to determine when the web server is available again. Such a URL or URI status resource can include information on when the web server's outage is expected to be resolved and/or contact information for a user to receive further information. Such embodiments offer the advantage of limiting future requests to the web server as future requests can be directed to the status resource instead of the web server.

In some embodiments, the status resource can be implemented using a websocket URL. A websocket URL can enable interaction between a web browser (or other client) and the status resource with low overhead and can facilitate real-time data transfer from and to the status resource. This connection can remain open and the status resource can provide information to the web browser regarding the web server's status over time. The websocket URL can be a long-standing connection to a specified server status port and can be embedded in an error page, such as in a page containing a 503: Server Unavailable code. When the web server becomes available, the status resource can communicate this information to the web browser using the websocket, including by notifying the browser using the server status port when the requested website comes back on line and it is time for the browser or device to refresh. The web browser can be configured to refresh the website upon receiving such information or additionally upon receipt of an instruction to do so. In websocket embodiments, the user device will not have to poll or refresh any websites, nor will the web server receive repeated requests for access, providing advantages to both parties.

In some embodiments, the status resource can be implemented by establishing a messaging endpoint. The status resource can establish a messaging endpoint through various conventional methods, but generally can provide the user's web browser or device with a messaging endpoint to which the status resource can connect and send messages and the user device's web browser will receive messages. Establishing the messaging endpoint may include identifying the appropriate message channel, language, data format, or any applicable configurations necessary for the status resource to communicate with the user device's web browser or other client application and for the user device's web browser or other client application to understand the messages received. The status resource can provide information to the web browser at the messaging endpoint regarding the web server's status over time. When the web server becomes available, the status resource can communicate this information to the web browser using the messaging endpoint. The web browser can be configured to refresh the website upon receiving such information or additionally upon receipt of an instruction to do so. In some embodiments, the messaging endpoint can allow for two-way communication such that the user's device can request an update from the status resource (such as via the browser). In messaging endpoint embodiments, the user device will not have to poll or refresh any websites, nor will the web server receive repeated requests for access, providing advantages to both parties.

In some embodiments, the intermediate server may identify more than one status resource or means for implementing communication with the status resource. For example, a status resource may be able to communicate via both a websocket URL and by establishing a messaging endpoint. The intermediate server may select a status resource or method of communicating with the status resource, or the intermediate server may present multiple options to a user device.

At 112, the intermediate server provides the status resource information to the requesting device, e.g. via the device's web browser. This can include registering information with the web browser or device that the website is down and that the web browser or device should not retry, but instead that it should communicate with the identified status resource. In embodiments where the status resource is another website identified by an HTTP URL or URI or websocket URL, the intermediate server can provide the appropriate address to the user device, such as via the web browser. In embodiments where the status resource is implemented by establishing a messaging endpoint, the intermediate server can establish the messaging endpoint or provide information regarding the status resource which can enable the status resource to establish the messaging endpoint.

Operation 114 may not be used in all embodiments. In some embodiments, the intermediate server may also host the status resource or serve as an intermediate to the status resource. In these embodiments, the status resource can transmit updates from the status resource to the requesting user device. This can include posting information or providing access to information on another website identified by an HTTP URL or URI. This can include transmitting information through a websocket URL. This can include transmitting messages on a messaging channel to a messaging endpoint.

Once the web server hosting the website becomes available, the web browser or device can receive from the status resource (and in some embodiments through or from the intermediate server) a status update indicating the website is available. At this time, method 100 can return to operation 104 and the intermediate server can receive another request for website access. In some embodiments, a web browser can be configured to refresh the website upon receiving such information or additionally upon receipt of an instruction to do so, thereby sending the request received at operation 104.

Method 100 can then continue to operation 106 to attempt to process the new request. In some embodiments, the intermediate server can refuse to send the new request to the web server unless it has received information from the status resource that the web server is available. This could occur if the device requesting access prematurely sent another request for website access before the status resource transmitted an update indicating the web server was available. In such embodiments, the intermediate server can redirect the requesting device to the status resource, without attempting to process the request with the still-unavailable web server.

Once the intermediate server attempts to process the request at 106 and determines at 108 when the website is available, method 100 can proceed to 116 and the intermediate server can provide website access. This can occur by sending the request to the web server and returning the received information to the requesting user, web browser, or device. After the access to the website has been provided at 116, method 100 ends at 118.

Figure 2:
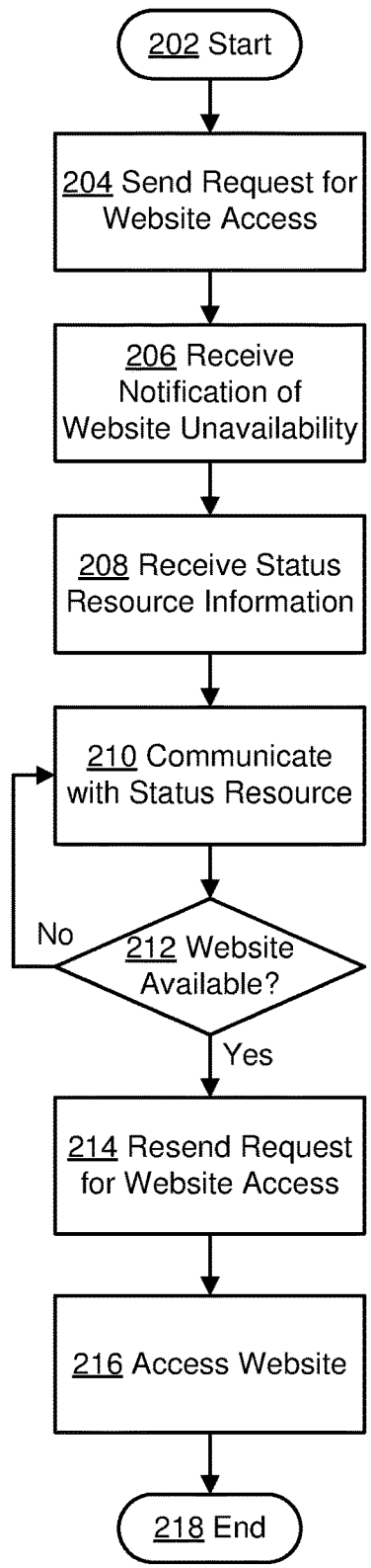
FIG. 2 depicts an example method for accessing a website access using a status resource, in accordance with embodiments of the present disclosure.

Referring now to FIG. 2, depicted is an example method 200 for accessing a website using a status resource, in accordance with embodiments of the present disclosure. Method 200 can include more or less actions than those depicted. Method 200 can include actions in different orders than those depicted. Method 200 can be performed using a user device (such as user device 500 depicted in FIG. 5).

From start 202, the user device sends a request for website access at 204. This can be in response to receiving user input. For example, the user input can be received by a user using a web browser, such as one found on a desktop computer, laptop computer, mobile phone, tablet, gaming system, or any other device which includes a web browser. A user could also provide user input to initiate a request using any other device or program which can access internet websites. This request can be received by an intermediate server (such as intermediate server 400 depicted in FIG. 4), which can be a proxy server or other intermediate server which a user or user's web browser can access when attempting to connect to a website hosted by a web server.

At 206, the user device receives a notification of website unavailability. This could include an appropriate HTTP code such as 503: Server Unavailable or other indication that the website or web server hosting the website is unavailable and the request for website access cannot be completed. This notification can come from an intermediate server, such as if the web server is unable to process requests.

At 208, the user device receives status resource information from the intermediate server. Operation 208 can occur at the same time as operation 206. This can include receiving a notification that the web browser or device should not retry, but instead that it should communicate with the identified status resource. The status resource information can take various forms in various embodiments. Examples of status resources are discussed above regarding operation 110 through 114 of FIG. 1. Examples of status resource information a user device may receive include another website identified by an HTTP URL or URI for the user device to monitor, a websocket URL for the user device to connect to and receive status updates through, or a messaging endpoint and/or information regarding the status resource which can enable the status resource to establish a messaging endpoint for the user device to connect to and use to receive status updates. Each of these status resources can be used to obtain information regarding the website or web server's availability. In some embodiments, the status resource can be embedded in an error page, such as in a page containing a 503: Server Unavailable code discussed above at block 206.

At 210, the user device communicates with the status resource. The nature of this communication depends on the type of status resource. In embodiments using another website identified by an HTTP URL or URI for the user device to monitor, the communication can take the form of the user device accessing the HTTP URL or URI and receiving the information contained at that HTTP URL or URI. In embodiments using a websocket URL or a messaging endpoint, the communication can be status updates which the user device receives from the status resource and/or messages sent to the status resource requesting status updates.

At 212, the user device checks whether the communication with the status resource indicates the website is available. If the website is not yet available, communication with the status resource continues (which may involve waiting for a communication from the status resource) by returning to operation 210. If the communication with the status resource indicates the website is available, then method 200 proceeds to operation 214.

At 214, the user device resends the request for website access. This can occur automatically upon receipt of information from the status resource or upon receipt of user input including an instruction to retry or refresh the website.

At 216, the user device accesses the website. This can involve receiving the information contained on the website through an intermediate server. This can occur through a variety of conventional means. After accessing the website at 216, method 200 ends at 218.

Figure 3:
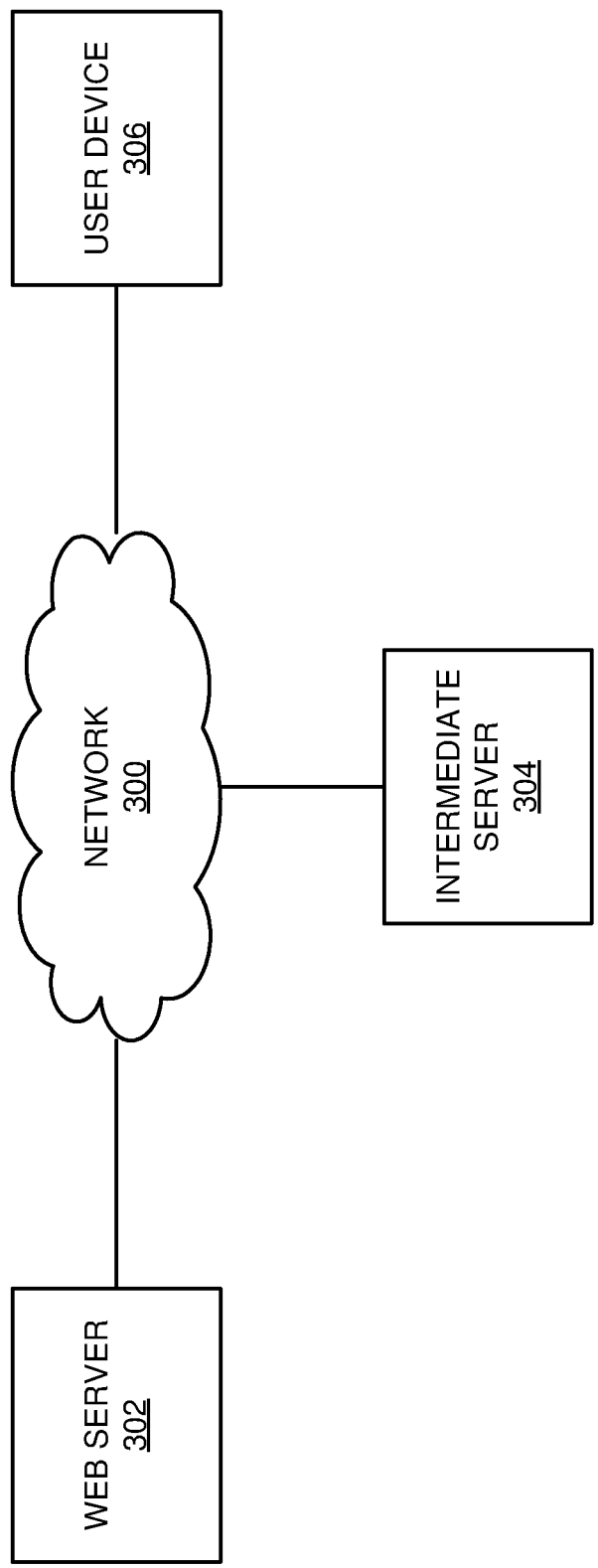
FIG. 3 illustrates a block diagram of a network in which some embodiments of the present disclosure can be implemented.

FIG. 3 illustrates a block diagram of network 300 in which some embodiments of the present disclosure can be implemented. Network 300 communicatively couples web server 302, intermediate server 304, and user device 306 via a wired and/or wireless connection. Network 300 can be as large as the internet or can be a smaller network such as a wide area network (WAN), metropolitan area network (MAN), an intranet for a company or other organization, or any other form of network. In some embodiments, intermediate server 304 is consistent with intermediate server 400 of FIG. 4. In some embodiments, user device 306 is consistent with user device 500 of FIG. 5.

An intermediate server 304 can be used in performing method 100 for facilitating website access using a status resource. A user device 306 can send a request for access to a website, which is hosted on web server 302. Intermediate server 304 can facilitate this request and when web server 302 is unavailable, perform the remainder of method 100, including identifying a status resource and facilitating communications between user device 306 and the status resource. The user device 306 can access websites, including the website hosted on web server 302 and perform method 200 for accessing a website access using a status resource, when web server 302 is unavailable. Web server connected 302 may be connected directly to intermediate server 304, instead of or in addition to being connected to network 300. One or more status resources may be present on one or more devices depicted in FIG. 3 (such as web server 302 or intermediate server 304) or may be present on devices not depicted in FIG. 3. Communication between user device 306 and the status resource may occur through network 300 and/or through intermediate server 304 in some embodiments.

Figure 4:
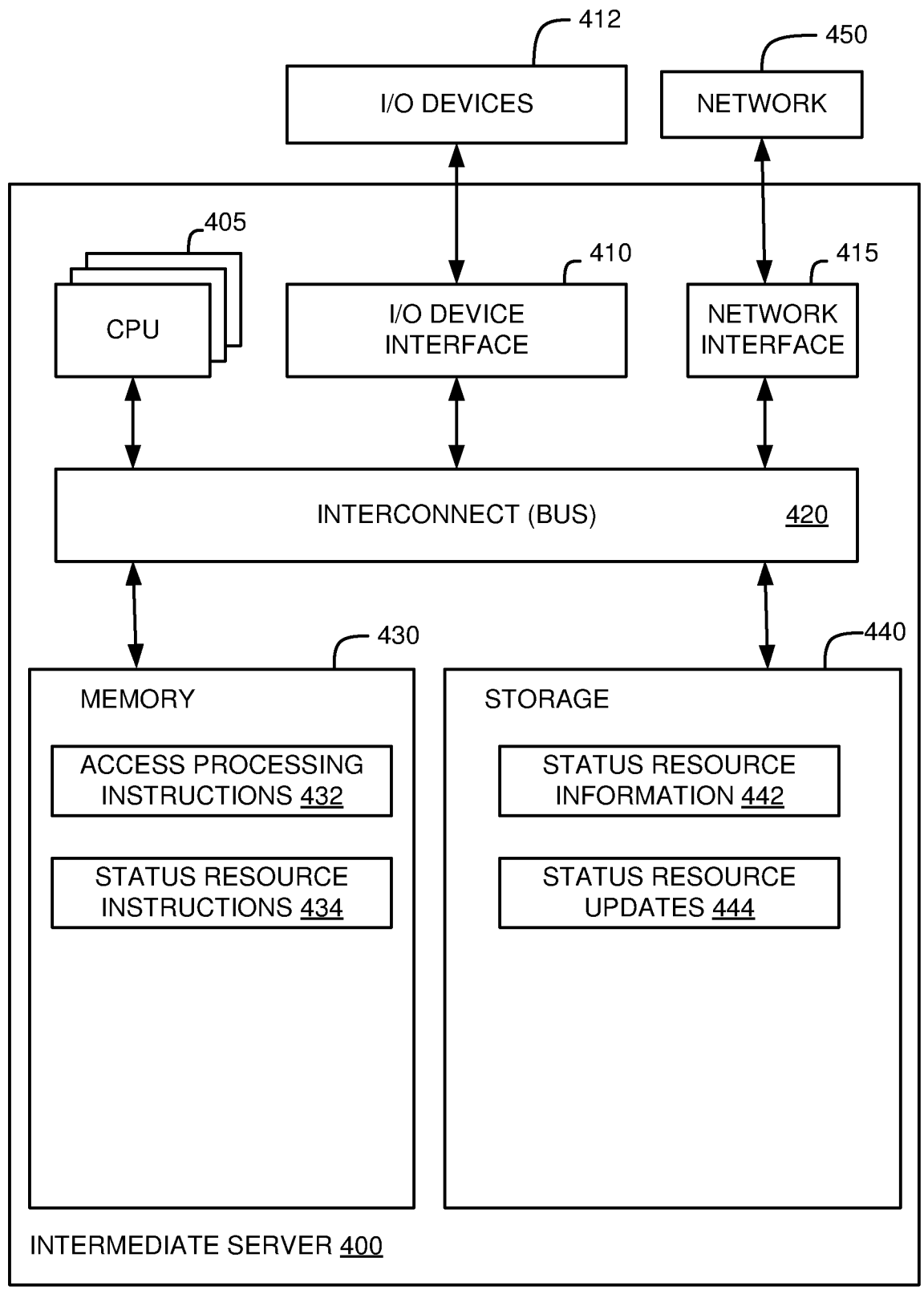
FIG. 4 illustrates a block diagram of an intermediate server, in accordance with some embodiments of the present disclosure.

Referring now to FIG. 4, illustrated is a block diagram of an intermediate server 400, in accordance with some embodiments of the present disclosure. In some embodiments, intermediate server 400 performs operations in accordance with FIG. 1 as described above. The intermediate server 400 can include one or more processors 405 (also referred to herein as CPUs 405), an I/O device interface 410 which can be coupled to one or more I/O devices 412, a network interface 415, an interconnect (e.g., BUS) 420, a memory 430, and a storage 440.

In some embodiments, each CPU 405 can retrieve and execute programming instructions stored in the memory 430 or storage 440. The interconnect 420 can be used to move data, such as programming instructions, between the CPUs 405, I/O device interface 410, network interface 415, memory 430, and storage 440. The interconnect 420 can be implemented using one or more busses. Memory 430 is generally included to be representative of a random access memory (e.g., static random access memory (SRAM), dynamic random access memory (DRAM), or Flash).

In some embodiments, the memory 430 can be in the form of modules (e.g., dual in-line memory modules). The storage 440 is generally included to be representative of a non-volatile memory, such as a hard disk drive, solid state device (SSD), removable memory cards, optical storage, or flash memory devices. In an alternative embodiment, the storage 440 can be replaced by storage area-network (SAN) devices, the cloud, or other devices connected to the intermediate server 400 via the I/O devices 412 or a network 450 via the network interface 415.

The CPUs 405 can be a single CPU, multiple CPUs, a single CPU having multiple processing cores, or multiple CPUs with one or more of them having multiple processing cores in various embodiments. In some embodiments, a processor 405 can be a digital signal processor (DSP). The CPUs 405 can additionally include one or more memory buffers or caches (not depicted) that provide temporary storage of instructions and data for the CPUs 405. The CPUs 405 can be comprised of one or more circuits configured to perform one or more methods consistent with embodiments of the present disclosure.

The memory 430 of intermediate server 400 includes access processing instructions 432 and status resource instructions 434. Access processing instructions 432 can be processor-executable instructions for processing requests for access to a website. Access processing instructions 432 can take various forms in various embodiments. Access processing instructions 432 can include instructions for sending requests from a user device (such as user device 306 of FIG. 3 or user device 500 of FIG. 5) to a web server (such as web server 302 of FIG. 3) for access to a website hosted on the web server. Access processing instructions 432 can also include instructions for receiving responses from the web server, including responses which indicate the web server is down or unavailable and responses including the requested web site information or other content requested by a user.

Status resource instructions 434 can be processor-executable instructions for identifying a status resource which can provide updates on the status of the web server. Status resource instructions 434 can also include instructions for selecting between, or presenting for selection by a user, multiple different status resources and/or types of connections to establish with a status resource. In some embodiments status resource instructions 434 can include instructions for facilitating communication between a user device and a status resource, including relaying messages between the user device and the status resource.

Storage 440 contains status resource information 442 and status resource updates 444. Status resource information 442 can be a list of potential or available status resources capable of providing status updates for a web server. Status resource information 442 can also be information received from a web server experiencing an outage identifying one or more status resources to use in communicating with users attempting to access websites on the web server. Status resource information 442 can be information which will allow a user device to identify and communicate with a status resource identified by an intermediate server. Status resource information 442 can be an HTTP URL or URI of another website or websocket URL identified by the intermediate server and provided to a user device to monitor for information regarding a website's availability. In embodiments where the status resource is implemented by establishing a messaging endpoint, status resource information 442 can be an established messaging endpoint or information regarding the status resource which can enable the status resource to establish the messaging endpoint.

Status resource updates 444 can be present on intermediate server 400 in embodiments where intermediate server 400 facilitates communication between a user device and a status resource, including relaying messages between the user device and the status resource. Status resource updates 444 can be stored for transfer from a status resource to a user device and may exist on intermediate server 400 for a limited time until sent to one or more user devices. In some embodiments, intermediate server 400 can also communicate with the status resource to determine availability of the web server, in which case, intermediate server 400 will receive these updates as a user device would.

In some embodiments as discussed above, the memory 430 stores access processing instructions 432 and status resource instructions 434, and the storage 440 stores status resource information 442 and status resource updates 444. However, in various embodiments, each of the access processing instructions 432, status resource instructions 434, status resource information 442, and status resource updates 444 are stored partially in memory 430 and partially in storage 440, or they are stored entirely in memory 430 or entirely in storage 440, or they are accessed over a network 450 via the network interface 415.

In various embodiments, the I/O devices 412 can include an interface capable of presenting information and receiving input. For example, I/O devices 412 can receive input from an administrator of the intermediate server and present information to the administrator or a device interacting with intermediate server 400.

In some embodiments, the network 450 is consistent with network 300 as described with respect to FIG. 3. The network 450 can connect (via a wired and/or wireless connection) the intermediate server 400 with other networks, and/or one or more devices (e.g., server 302 of FIG. 3 and user device 306 of FIG. 3) that interact with the intermediate server.

Logic modules throughout the intermediate server 400—including but not limited to the memory 430, the CPUs 405, and the I/O device interface 410—can communicate failures and changes to one or more components to a hypervisor or operating system (not depicted). The hypervisor or the operating system can allocate the various resources available in the intermediate server 400 and track the location of data in memory 430 and of processes assigned to various CPUs 405. In embodiments that combine or rearrange elements, aspects and capabilities of the logic modules can be combined or redistributed. These variations would be apparent to one skilled in the art.

Figure 5:
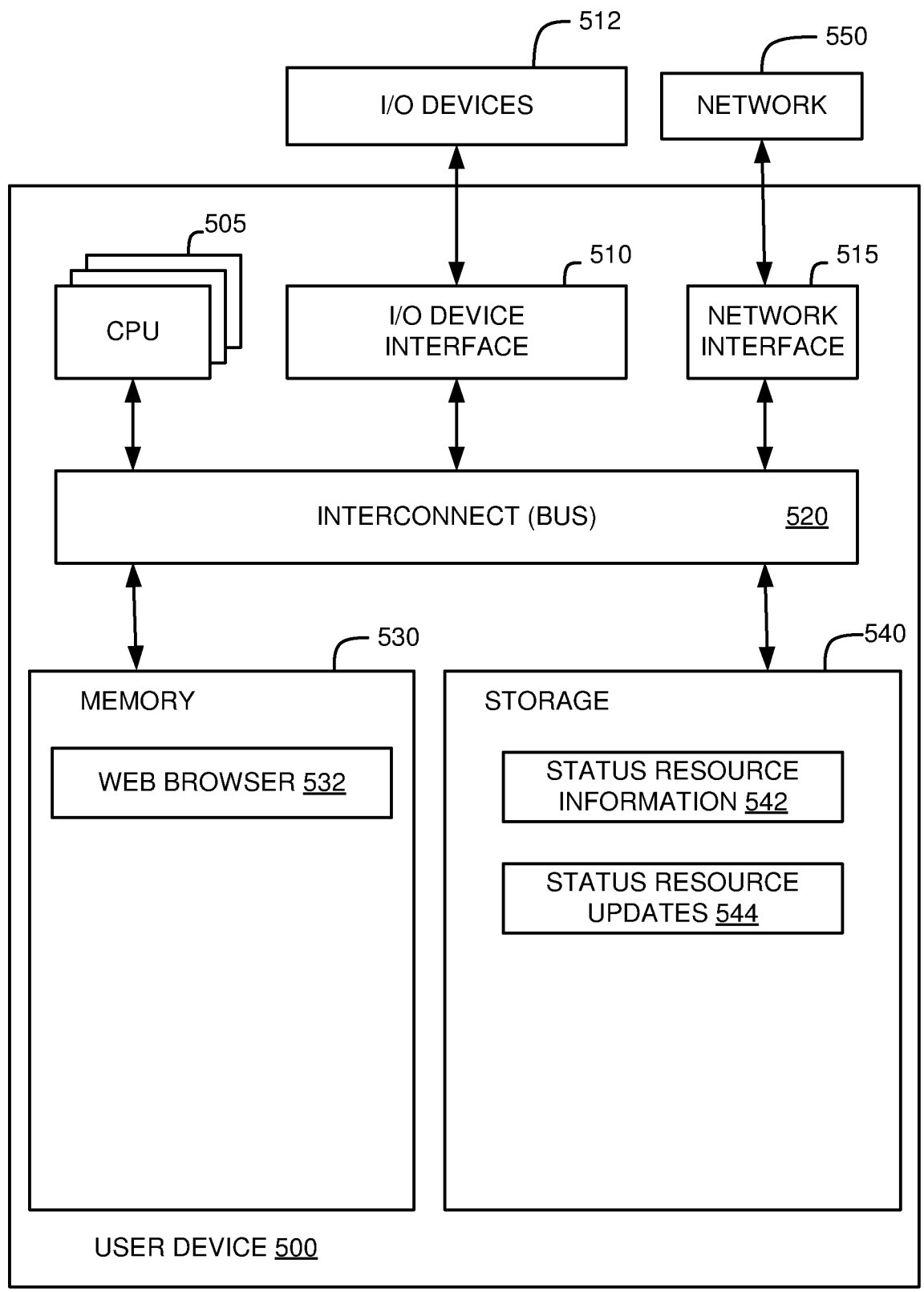
FIG. 5 illustrates a block diagram of a user device, in accordance with some embodiments of the present disclosure.

Referring now to FIG. 5, illustrated is a block diagram of a user device 500, in accordance with some embodiments of the present disclosure. In some embodiments, user device 500 performs operations in accordance with FIG. 2 and/or can be used by a user to perform operations in accordance with FIG. 2 as described above. The user device 500 can include one or more processors 505 (also referred to herein as CPUs 505), an I/O device interface 510 which can be coupled to one or more I/O devices 512, a network interface 515, an interconnect (e.g., BUS) 520, a memory 530, and a storage 540.

In some embodiments, each CPU 505 can retrieve and execute programming instructions stored in the memory 530 or storage 540. The interconnect 520 can be used to move data, such as programming instructions, between the CPUs 505, I/O device interface 510, network interface 515, memory 530, and storage 540. The interconnect 520 can be implemented using one or more busses. Memory 530 is generally included to be representative of a random access memory (e.g., static random access memory (SRAM), dynamic random access memory (DRAM), or Flash).

In some embodiments, the memory 530 can be in the form of modules (e.g., dual in-line memory modules). The storage 540 is generally included to be representative of a non-volatile memory, such as a hard disk drive, solid state device (SSD), removable memory cards, optical storage, or flash memory devices. In an alternative embodiment, the storage 540 can be replaced by storage area-network (SAN) devices, the cloud, or other devices connected to the user device 500 via the I/O devices 512 or a network 550 via the network interface 515.

The CPUs 505 can be a single CPU, multiple CPUs, a single CPU having multiple processing cores, or multiple CPUs with one or more of them having multiple processing cores in various embodiments. In some embodiments, a processor 505 can be a digital signal processor (DSP). The CPUs 505 can additionally include one or more memory buffers or caches (not depicted) that provide temporary storage of instructions and data for the CPUs 505. The CPUs 505 can be comprised of one or more circuits configured to perform one or more methods consistent with embodiments of the present disclosure.

The memory 530 of user device 500 includes web browser 532. Web browser 532 can be a conventional web browser and can be by a user to access websites. Web browser 532 can also be used to communicate via websocket URL and/or messaging endpoints established by a status resource in accordance with methods 100 and 200 discussed above. Web browser 532 can also include instructions for automatically refreshing a website upon receipt of a status update from a status resource which indicates a requested website became available after it was previously unavailable.

Storage 540 contains status resource information 542 and status resource updates 544. Status resource information 542 can be information which allows user device 500 to identify and communicate with a status resource identified by an intermediate server. Status resource information 542 can be an HTTP URL or URI of another website or websocket URL identified by the intermediate server and provided to a user to monitor for information regarding a website's availability. In embodiments where the status resource is implemented by establishing a messaging endpoint, status resource information 542 can be an established messaging endpoint or information regarding the status resource which can enable the status resource to establish the messaging endpoint.

Status resource updates 544 can be information received from a status resource which indicate the availability of a web server or website to which the user device 500 has requested access and has been unable to access due to an outage.

In some embodiments as discussed above, the memory 530 stores web browser 532, and the storage 540 stores status resource information 542 and status resource updates 544. However, in various embodiments, each of the decryption instructions 532, status resource information 542 and status resource updates 544 are stored partially in memory 530 and partially in storage 540, or they are stored entirely in memory 530 or entirely in storage 540, or they are accessed over a network 550 via the network interface 515.

In various embodiments, the I/O devices 512 can include an interface capable of presenting information and receiving input. For example, I/O devices 512 can receive input from a user and present information to a user and/or a device interacting with user device 500.

In some embodiments, the network 550 is consistent with network 300 as described with respect to FIG. 3. The network 550 can connect (via a physical or wireless connection) the user device 500 with other networks, and/or one or more devices (e.g., intermediate server 304 of FIG. 3) that interact with the user device.

Logic modules throughout the user device 500—including but not limited to the memory 530, the CPUs 505, and the I/O device interface 510—can communicate failures and changes to one or more components to a hypervisor or operating system (not depicted). The hypervisor or the operating system can allocate the various resources available in the user device 500 and track the location of data in memory 530 and of processes assigned to various CPUs 505. In embodiments that combine or rearrange elements, aspects and capabilities of the logic modules can be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for facilitating website access using a status resource, the method comprising:
   receiving, by a server, from an application on a device, a first request for access to a website hosted on a web server;
   determining, by the server, the website is unavailable;
   identifying, by the server, the status resource, wherein the status resource is a resource configured to provide in-band updates on an availability of the website directly to the device, the in-band updates being received by the status resource from the web server, the status resource being separate from the server;
   providing, by the server, status resource information to the device via the application,
   wherein the status resource information includes information that enables the device to communicate directly with the status resource to receive updates regarding the website without communicating with the web server or the server, and
   wherein the server is configured to redirect any subsequent requests received before the status resource indicates that the website is available to the status resource without attempting to process the subsequent requests;
   receiving, by the server, a second request for website access from the application on the device after the status resource provides an update to the device that indicates that the website is available; and
   providing, by the server, access to the website to the device responsive to the second request.

2. The method of claim 1, wherein the status resource information is a websocket uniform resource locator, wherein the websocket uniform resource locator provides an open connection over which the status resource provides status information regarding the website to the application.

3. The method of claim 1, wherein the status resource information includes instructions for establishing a messaging endpoint, wherein the status resource information includes a message channel, language, and data format for the messaging endpoint, and wherein the messaging endpoint enables two-way communication between the device and the status resource.

4. The method of claim 1, wherein the status resource is configured to transmit an update to the application when the website becomes available, and wherein the second request is transmitted automatically, without user input, in response to receiving notification that the website is available.

5. The method of claim 1, wherein the status resource information is embedded in an error page.

6. The method of claim 5, wherein the status resource information embedded in the error page includes a server status port on which updates regarding the status of the website will be provided.

7. The method of claim 1, the method further comprising:
   receiving, by the server, a third request for website access from the application on the device;
   determining, by the server, in response to receiving the third request, that the server has not received a notification from the status resource indicating that the website is available; and
   redirecting, by the server, the application to the status resource without attempting to process the third request with the web server.

8. The method of claim 1, wherein determining that the website is unavailable comprises:
   attempting to process the first request with the web server; and
   receiving, by the server, from the web server, a response having an error code.

9. The method of claim 1, wherein identifying the status resource comprises:
   accessing, by the server, a list of status resources capable of providing status information; and
   selecting the status resource from the list of status resources based on the website that the device is requesting access to.

10. The method of claim 9, wherein providing status resource information to the device comprises:
    identifying, by the server, two or more status resources that can provide status information for the website from the list of status resources; and
    providing, by the server the two or more status resources to the device as separate options.

11. The method of claim 1, wherein the status resource information includes:
    a first instruction that the application is not to retry accessing the website; and
    a second instruction to communicate with the status resource when requesting updates on the status of the website.

12. A system for facilitating website access using a status resource, the system comprising:
    one or more processors; and
    a memory communicatively coupled to the one or more processors,
    wherein the memory comprises instructions which, when executed by the one or more processors, cause the one or more processors to perform a method comprising:
    receiving, from an application on a device, a first request for access to a website hosted on a web server;
    determining the website is unavailable;
    identifying the status resource, wherein the status resource is a resource configured to provide in-band updates on an availability of the website directly to the device, the in-band updates being received by the status resource from the web server, the status resource being separate from the system;

providing status resource information to the device via the application, wherein the status resource information includes information that enables the device to communicate directly with the status resource to receive updates regarding the website without communicating with the web server or the system, and wherein the processor is configured to redirect any subsequent requests received before the status resource indicates that the website is available to the status resource without attempting to process the subsequent requests;

receiving a second request for website access from the application on the device after the status resource provides an update to the device that indicates that the website is available; and providing access to the website to the device responsive to the second request.

13. The system of claim 12, wherein the status resource information is an HTTP uniform resource identifier.

14. The system of claim 12, wherein the second request is transmitted automatically, without user input, in response to receiving notification that the website is available.

15. The system of claim 12, wherein the status resource information is embedded in an error page.

16. A computer program product for facilitating website access using a status resource, the computer program product comprising a computer readable storage medium having program instructions embodied therewith, wherein the computer readable storage medium is not a transitory signal per se, the program instructions executable by a computer to perform a method comprising:

receiving, from an application on a device, a first request for access to a website hosted on a web server;

determining the website is unavailable;

identifying the status resource, wherein the status resource is a resource configured to provide in-band updates on an availability of the website directly to the device, the in-band updates being received by the status resource from the web server, the status resource being separate from the computer;

providing status resource information to the device via the application, wherein the status resource information includes information that enables the device to communicate directly with the status resource to receive updates regarding the website without communicating with the web server or the computer, and wherein the computer is configured to redirect any subsequent requests received before the status resource indicates that the website is available to the status resource without attempting to process the subsequent requests;

receiving a second request for website access from the application on the device after the status resource provides an update to the device that indicates that the website is available; and providing access to the website to the device responsive to the second request.

17. The computer program product of claim 16, wherein the status resource information is a websocket uniform resource locator.

18. The computer program product of claim 16, wherein the status resource information includes instructions for establishing a messaging endpoint.

* * * * *